(12) United States Patent
Wang

(10) Patent No.: US 9,315,644 B2
(45) Date of Patent: *Apr. 19, 2016

(54) CURED PERFLUOROELASTOMER ARTICLE

(71) Applicant: E I DU PONT DE NEMOURS AND COMPANY, Wilmington, DE (US)

(72) Inventor: Shuhong Wang, Hockessin, DE (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 7 days.

This patent is subject to a terminal disclaimer.

(21) Appl. No.: 13/692,124

(22) Filed: Dec. 3, 2012

(65) Prior Publication Data

US 2014/0155532 A1  Jun. 5, 2014

(51) Int. Cl.
| | |
|---|---|
| C04B 28/14 | (2006.01) |
| C08F 14/18 | (2006.01) |
| C08F 16/24 | (2006.01) |
| C08F 36/16 | (2006.01) |
| C08F 136/16 | (2006.01) |
| C08F 236/16 | (2006.01) |
| C08K 3/30 | (2006.01) |

(52) U.S. Cl.
CPC ............ *C08K 3/30* (2013.01); *C08K 2003/3045* (2013.01)

(58) Field of Classification Search
None
See application file for complete search history.

(56) References Cited

U.S. PATENT DOCUMENTS

| | | |
|---|---|---|
| 4,281,092 A | 7/1981 | Breazeale |
| 4,394,489 A | 7/1983 | Aufdermarsh |
| 5,789,489 A | 8/1998 | Coughlin et al. |
| 5,789,509 A | 8/1998 | Schmiegel |
| 5,877,264 A | 3/1999 | Logothetis et al. |
| 6,211,319 B1 | 4/2001 | Schmiegel |
| 6,281,296 B1 | 8/2001 | MacLachlan et al. |
| 6,638,999 B2 | 10/2003 | Bish et al. |
| 6,846,880 B2 | 1/2005 | Grootaert et al. |
| 2003/0119993 A1* | 6/2003 | Apostolo et al. ............ 525/326.2 |
| 2004/0054055 A1* | 3/2004 | Fukushi ................ C08F 214/16 524/423 |
| 2005/0107544 A1* | 5/2005 | Wang .......................... 525/326.2 |
| 2007/0027260 A1 | 2/2007 | Aufdermarsh et al. |
| 2010/0151254 A1* | 6/2010 | Luo et al. ...................... 428/422 |

FOREIGN PATENT DOCUMENTS

| | | |
|---|---|---|
| EP | 1464671 A1 | 10/2004 |
| JP | 8151450 A | 6/1996 |
| JP | 2001192643 A | 7/2001 |
| WO | 0127194 A1 | 4/2001 |
| WO | 2005049712 A1 | 6/2005 |

OTHER PUBLICATIONS

Kibiki, Kazuhiko et al., "Fluororubber seals for manufacture of semiconductor devices", Database CA (Online) Chemical Abstracts Service, Columbus, Ohio, US; XP002721561, retrieved from STN Database accession No. 2001:519218 abstract & JP2001192643A (Mitsubishi Cable Industries, Ltd. Japan) Jul. 17, 2001, paragraph [0030]; claims; examples.

Satsuka, Isco et al., "Ozone-resistant fluoroelastomer moldings", Database CA (Online) Chemical Abstracts Service, Columbus, Ohio, US; XP002721560, retrieved from STN Database accession No. 1996:505927 abstract & JP8151450A (Nihon Valqua Kogyo KK, Japan) Jun. 11, 1996, paragraphs [0009], [0023]-[0025]; claims; examples 2-4, 6.

* cited by examiner

*Primary Examiner* — Susannah Chung
*Assistant Examiner* — Robert T Butcher

(57) ABSTRACT

Cured perfluoroelastomers that contain high levels (i.e. greater than 50 phr) $BaSO_4$ exhibit good thermal sealing performance such as reduced sticking and reduced tendency for splitting.

4 Claims, No Drawings

CURED PERFLUOROELASTOMER ARTICLE

FIELD OF THE INVENTION

This invention relates to cured perfluoroelastomer articles, and in particular to cured perfluoroelastomer articles comprising more than 50 parts by weight barium sulfate per hundred parts by weight perfluoroelastomer.

BACKGROUND OF THE INVENTION

Perfluoroelastomer articles have achieved outstanding commercial success and are used in a wide variety of applications in which severe environments are encountered, in particular those end uses where exposure to high temperatures and aggressive chemicals occurs. For example, these articles are often used in seals for aircraft engines, in oil-well drilling devices, and in sealing elements for industrial equipment that operates at high temperatures.

The outstanding properties of perfluoroelastomer articles are largely attributable to the stability and inertness of the copolymerized perfluorinated monomer units that make up the major portion of the polymer backbones in these articles. Such monomers include tetrafluoroethylene and perfluoro (alkyl vinyl) ethers. In order to develop elastomeric properties fully, perfluoroelastomer polymers are cured, i.e. crosslinked. To this end, a small percentage of cure site monomer is copolymerized with the perfluorinated monomer units. Cure site monomers containing at least one nitrile group, for example perfluoro-8-cyano-5-methyl-3,6-dioxa-1-octene, are especially preferred. Such compositions are described in U.S. Pat. Nos. 4,281,092; 4,394,489; 5,789,489; and 5,789,509.

Perfluoroelastomer articles that are employed in high temperature environments (i.e. >250° C.) can break or split and may also become sticky.

It would be an improvement to have cured perfluoroelastomer elastomer articles that are resistant to breaking or splitting and to becoming sticky at high temperature.

SUMMARY OF THE INVENTION

It has been surprisingly discovered that cured perfluoroelastomer articles that contain a high level of $BaSO_4$ are resistant to splitting and becoming sticky at high temperature, while maintaining good compression set.

Accordingly, an aspect of the present invention is directed to a cured perfluoroelastomer article comprising
A) a perfluoroelastomer comprising copolymerized units of i) 15 to 60 mole percent perfluoro(alkyl vinyl ether), ii) 0.1 to 5 mole percent of a cure site monomer and the remaining copolymerized units being of iii) tetrafluoroethylene so that total mole percent is 100; and
B) greater than 50 parts by weight, per hundred parts by weight perfluoroelastomer, of $BaSO_4$.

DETAILED DESCRIPTION OF THE INVENTION

The perfluoroelastomers employed in the cured articles of the present invention are capable of undergoing crosslinking reactions (i.e. curing) with any of the common curatives for perfluoroelastomers such as, but not limited to organotin (U.S. Pat. No. 5,789,489), bis(aminophenols) such as diaminobisphenol AF (U.S. Pat. No. 6,211,319 B1), aromatic tetraamines such as 3,3'-diaminobenzidene, ammonia generating compounds such as urea and other compounds (U.S. Pat. No. 6,281,296 and WO 01/27194), guanidines (U.S. Pat. No. 6,638,999) and amidines (U.S. Pat. No. 6,846,880 and U.S. Patent Publication 20070027260).

Perfluoroelastomers which may be employed in this invention are based on copolymerized units of tetrafluoroethylene (TFE), a perfluoro(alkyl vinyl ether) (PAVE) and a cure site monomer that contains nitrile groups.

Suitable perfluoro(alkyl vinyl ethers) include, but are not limited to those of the formula

$$CF_2=CFO(R_fO)_n(R_{f'}O)_mR_f \qquad (I)$$

where $R_f$ and $R_{f'}$ are different linear or branched perfluoroalkylene groups of 2-6 carbon atoms, m and n are independently 0-10, and $R_f$ is a perfluoroalkyl group of 1-6 carbon atoms.

A preferred class of perfluoro(alkyl vinyl) ethers includes compositions of the formula

$$CF_2=CFO(CF_2CFXO)_nR_f \qquad (II)$$

where X is F or $CF_3$, n is 0-5, and $R_f$ is a perfluoroalkyl group of 1-6 carbon atoms.

A most preferred class of perfluoro(alkyl vinyl) ethers includes those ethers wherein n is 0 or 1 and $R_f$ contains 1-3 carbon atoms. Examples of such perfluorinated ethers include perfluoro(methyl vinyl) ether and perfluoro(propyl vinyl) ether. Other useful ethers include compounds of the formula

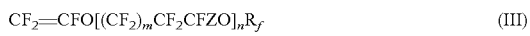

$$CF_2=CFO[(CF_2)_mCF_2CFZO]_nR_f \qquad (III)$$

where $R_f$ is a perfluoroalkyl group having 1-6 carbon atoms, m=0 or 1, n=0-5, and Z=F or $CF_3$. Preferred members of this class are those in which $R_f$ is $O_3F_7$, m=0, and n=1.

Additional perfluoro(alkyl vinyl) ether monomers include compounds of the formula

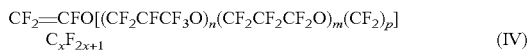

$$CF_2=CFO[(CF_2CFCF_3O)_n(CF_2CF_2CF_2O)_m(CF_2)_p]C_xF_{2x+1} \qquad (IV)$$

where m and n=0-10, p=0-3, and x=1-5. Preferred members of this class include compounds where n=0-1, m=0-1, and x=1.

Other useful perfluoro(alkyl vinyl ethers) include

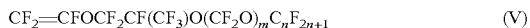

$$CF_2=CFOCF_2CF(CF_3)O(CF_2O)_mC_nF_{2n+1} \qquad (V)$$

where n=1-5, m=1-3, and where, preferably, n=1.

The perfluoroelastomer further contains copolymerized units of a cure site monomer having nitrile groups. Suitable cure site monomers include nitrile-containing fluorinated olefins and nitrile-containing fluorinated vinyl ethers. Useful nitrile-containing cure site monomers include, but are not limited to those of the formulas shown below.

$$CF_2=CF-O(CF_2)_n-CN \qquad (VI)$$

where n=2-12, preferably 2-6;

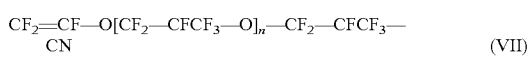

$$CF_2=CF-O[CF_2-CFCF_3-O]_n-CF_2-CFCF_3-CN \qquad (VII)$$

where n=0-4, preferably 0-2;

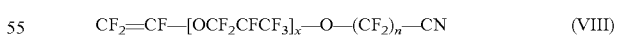

$$CF_2=CF-[OCF_2CFCF_3]_x-O-(CF_2)_n-CN \qquad (VIII)$$

where x=1-2, and n=1-4; and

$$CF_2=CF-O-(CF_2)_n-O-CF(CF_3)CN \qquad (IX)$$

where n=2-4.

Those of formula (VIII) are preferred. Especially preferred cure site monomers are perfluorinated polyethers having a nitrile group and a trifluorovinyl ether group. A most preferred cure site monomer is

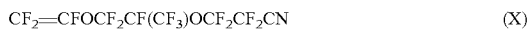

$$CF_2=CFOCF_2CF(CF_3)OCF_2CF_2CN \qquad (X)$$

i.e. perfluoro(8-cyano-5-methyl-3,6-dioxa-1-octene) or 8-CNVE.

The perfluoroelastomers that may be employed in the cured articles of this invention comprise copolymerized units of i) 15 to 60 (preferably 30 to 50) mole percent perfluoro (alkyl vinyl ether) and ii) 0.1 to 5.0 (preferably 0.3 to 2.0) mole percent nitrile group-containing cure site monomer. The remaining units being tetrafluoroethylene so that the total mole percent is 100. Most preferably the perfluoro(alkyl vinyl ether) is perfluoro(methyl vinyl ether)

Cured perfluoroelastomer articles of this invention also contain more than 50 phr $BaSO_4$, preferably more than 60 phr $BaSO_4$, most preferably between 70 and 100 phr of $BaSO_4$. By "phr" is meant parts by weight of ingredient, per hundred parts by weight rubber, i.e. perfluoroelastomer. Large particle size (i.e. 0.5 to 5 micron average) $BaSO_4$ is preferred. Such $BaSO_4$ is available commercially, e.g. Blanc Fixe F and Blanc Fixe XR-N (available from Sachtleben Chemie GmbH).

Other additives may be compounded into the perfluoroelastomer to optimize various physical properties. Such additives include, stabilizers, lubricants, pigments, fillers (e.g. mineral fillers such as silicas, alumina, aluminum silicate, titanium dioxide), and processing aids typically utilized in perfluoroelastomer compounding. Any of these additives can be incorporated into the compositions of the present invention, provided the additive has adequate stability for the intended service conditions.

The $BaSO_4$, crosslinking agent (i.e. curative), and optional other additives are generally incorporated into the perfluoroelastomer by means of an internal mixer or on a rubber mill. The resultant composition is then shaped and cured, generally by means of heat and pressure, for example by compression transfer or injection molding, to form the cured article of the invention. Typically the cured articles are also post cured.

Cured articles of the present invention are useful in production of gaskets, tubing, seals and other molded components.

The invention is now illustrated by certain embodiments wherein all parts and percentages are by weight unless otherwise specified.

EXAMPLES

Test Methods

Physical Properties

The following physical property parameters were recorded on K-214 O-rings; test methods are in parentheses:
- $T_b$: tensile strength, MPa (ASTM D412-92/D1414)
- $E_b$: elongation at break, % (ASTM D412-92/D1414)
- M100: modulus at 100% elongation, MPa (ASTM D412-92/D1414)
- Hardness, Shore M (ASTM D412-92/D1414)
- Compression Set B (ASTM D395/D1414)

Sticking Force and Oozing

A K-214 O-ring was placed between two 2"×2" stainless steel plates and a spacer inserted so that installed compression on the o-ring was 15% when the plates were bolted together. This assembly was placed in a forced air oven at 310° C. for 70 hours. The assembly was then allowed to cool for at least 3 hours and the bolts removed. Sticking force was measured in an Instron by recording the maximum force required to pull the assembly apart. Three o-rings were used for each test.

Oozing was determined by observing the surface of tested o-rings. A wet surface indicated oozing or surface degradation/melting.

The perfluoroelastomer (containing copolymerized units of tetrafluoroethylene (TFE), perfluoro(methyl vinyl ether) (PMVE) and 8-CNVE) employed in the Examples was made generally according to the process disclosed in U.S. Pat. No. 5,877,264. It contained 37.4 mole % copolymerized units of perfluoro(methyl vinyl ether) (PMVE), about 0.8 mole percent copolymerized units of 8-CNVE, the remainder being copolymerized units of TFE.

Example 1

Curable compositions were made by compounding the ingredients in a conventional manner on a 2-roll mill. The ingredients and proportions are shown in Table I.

Cured perfluoroelastomer articles were made by molding the curable compositions into K-214 O-rings and then curing. Articles of the invention contained more than 50 phr $BaSO_4$ (Blanc Fixe XR-HN). Comparative articles contained 50 phr or less $BaSO_4$ (Blanc Fixe XR-HN). The curative employed was diphenylguanidine phthalate. O-rings were press cured at 190° C. for 9-10 minutes, followed by post cure in a nitrogen oven at 305° C. for 26 hours after a slow ramp up from room temperature.

Physical properties of cured O-rings, sticking force and oozing were measured according to the Test Methods. Results are shown in Table I.

TABLE I

| | Comp. Sample A | Comp. Sample B | Sample 1 | Sample 2 |
|---|---|---|---|---|
| Formulation, phr | | | | |
| Perfluoroelastomer | 100 | 100 | 100 | 100 |
| $BaSO_4$ | 30 | 50 | 70 | 90 |
| Curative[1] | 1.1 | 1.1 | 1.1 | 1.1 |
| Physical Properties | | | | |
| Hardness, Shore M | 63 | 68 | 78 | 80 |
| M100, MPa | 2.4 | 4.14 | 5.67 | 7.05 |
| Tb, MPa | 6.58 | 10.72 | 10.64 | 9.99 |
| Eb, % | 189 | 235 | 231 | 200 |
| Compression Set, 25%, 200° C., 70 hours, % | 15 | 15 | 17 | 18 |
| Compression Set, 25%, 300° C., 70 hours, % | Split | Split | 46 | 58 |
| Sticking Force, N | 280 | 275 | 120 | 93 |
| Oozing | Wet | Slightly wet | Dry | Slightly wet |

[1]diphenylguanidine phthalate anhydrous

What is claimed is:

1. A cured perfluoroelastomer article comprising
   A) a perfluoroelastomer comprising copolymerized units of:
      i) 15 to 60 mole percent perfluoro(alkyl vinyl ether),
      ii) 0.1 to 5 mole percent of a cure site monomer having nitrile groups, and
      iii) the remaining copolymerized units being of tetrafluoroethylene so that total mole percent of i+ii+iii is 100; and
   B) greater than 60 parts by weight of $BaSO_4$ per hundred parts by weight perfluoroelastomer.

2. The cured perfluoroelastomer article of claim 1 comprising 70 to 100 parts by weight, per hundred parts by weight perfluoroelastomer, of $BaSO_4$.

3. The cured perfluoroelastomer article of claim 1 wherein said $BaSO_4$ has an average particle size of 0.5 to 5 microns.

4. The cured perfluoroelastomer article of claim 1 wherein the cure site monomer is selected from the group consisting of:

$CF_2=CF-O(CF_2)_n-CN$ where n=2-12, preferably 2-6;

$CF_2=CF-O[CF_2-CFCF_3-O]_n-CF_2-CFCF_3-CN$ where n=0-4, preferably 0-2;

$CF_2=CF-[OCF_2CFCF_3]_x-O-(CF_2)_n-CN$ where x=1-2, and n=1-4;

$CF_2=CF-O-(CF_2)_n-O-CF(CF_3)CN$ where n=2-4;

$CF_2=CFOCF_2CF(CF_3)OCF_2CF_2CN$;

and combinations of these.

* * * * *